March 2, 1965 W. BECKER 3,171,172
INJECTION PISTONS FOR PRESSURE CASTING MACHINES
Filed Feb. 11, 1963
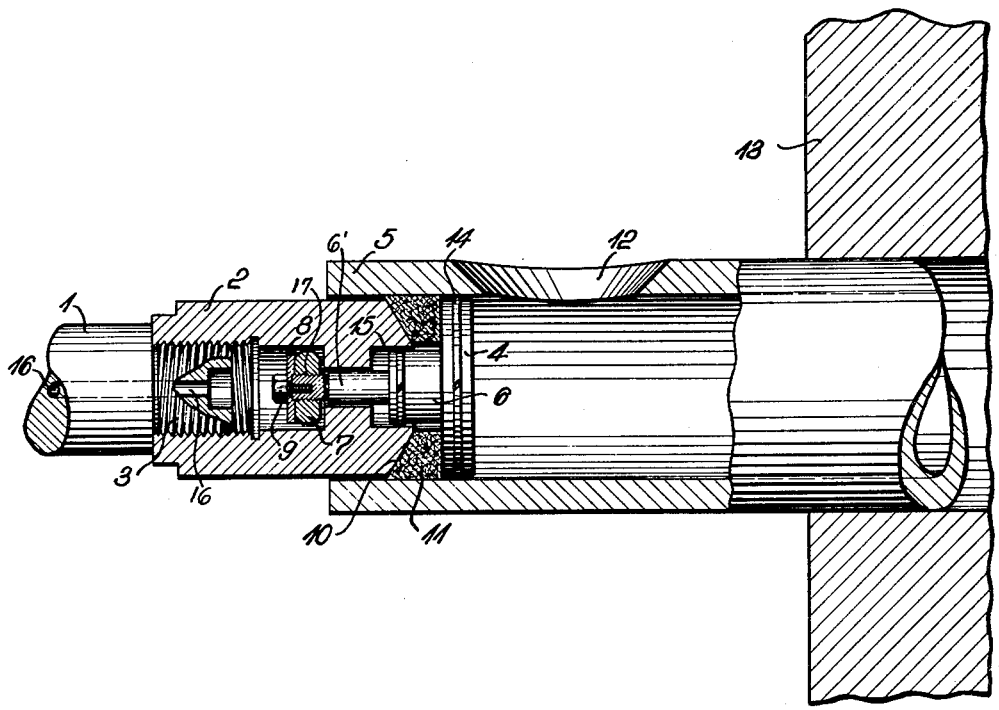
INVENTOR
Wilhelm Becker
By
Watson, Cole, Grindle + Watson
Attys.

United States Patent Office 3,171,172
Patented Mar. 2, 1965

3,171,172
INJECTION PISTONS FOR PRESSURE
CASTING MACHINES
Wilhelm Becker, Muhlenweg 13, Vorsfelde, Germany
Filed Feb. 11, 1963, Ser. No. 257,649
6 Claims. (Cl. 22—68)

This invention relates to an injection piston for pressure casting machines in which a filling box or case is filled with a fluid casting medium and is forced in the pressure casting form through a forced rapid form.

It is an object of this invention to provide for a piston packing in which an elastic ring is provided between a movable head piece and a conical or frusto-conical seating, so that by means of the conical seat and the pressure zone of the head piece on the packing ring there is very little wear but a sure packing is provided between the piston and the filling case. By the structure of this invention it is possible to provide a greater space between the piston and fill case The elastic packing consists for example of an asbestos material and the head piece of the piston is secured by a central member guided by a bolt which can be adjusted and is held at the end by a nut so that it is held against lateral shifting and is secured in place. The spreading cone is preferably provided on the end of the piston and the head piece is formed by a circular plate with centrally arranged guide bolt. An advantage of the injection piston is that due to the asbestos ring it is possible to place the material in the case or material chamber under full pressure.

A further object of the invention resides in the provision of piston rings in the head piece as well as in the piston member itself on a pin or bolt which is secured on the head piece. Another object of the invention resides in the provision of a bore extending longitudinally in the piston rod in order to force lubricant into the interior of the piston member but also onto the sides of the fill case or chamber. In this way the injection piston will be adequately provided so that upon the back stroke of the piston as distinguished from the feed stroke, the piston will be adequately lubricated relative to the sides of the fill box or chamber.

Further objects of the invention will be apparent from the following description when considered in connection with the accompanying drawing which is a longitudinal section through the piston and fill case as a preferred form of the invention.

On a hydraulically operable piston rod 1 there is mounted by screw threads, a pressure or force piston 2 mounted on a smaller projection 3 on the end of the piston rod 1. A head piece 4 which is mounted on the head end of the piston 2 consists of a circular or ring shaped disc having a surface contact with the fill case 5 and having a central guide bolt or projection 6 by means of which it is guided in a corresponding bore in the piston 2. This guide bolt or pin 6 is provided with a smaller bolt section 6' and finally has a threaded end section 17 which has a nut 7 threaded thereon to limit the movement of the head piece. This nut 7 is provided with a lock washer 8 and thus the screw 9 holds the washer 8 in place. The piston 2 is provided with conical surface 10 receeding outwardly and which may be described as a frusto-conical surface with its apex ring adjacent or near the center of the piston. An asbestos ring 11 is mounted between the head disc 4 and the frusto-conical surface 10 and this ring 11 is also provided with a conical or frusto-conical surface to match and to bear against the surface 10. The asbestos ring 11 upon the forward movement of the piston, to the right, will be forced outwardly or radially due to the movement of the piston 2 and the resistance of the material in the fill case 5, thus exerting a pressure force on the asbestos ring 11. Thus, upon the back or left motion of the piston the latter will be slightly separated from the conical surface of the asbestos ring 11 and the head piece 4 will pull the packing ring 11 back to contact the piston 2.

The casting material is filled into the fill case 5 in any desired manner which is well known and actually such material is fed or poured through the opening 12 and the case 5 secured to the pressure casting machine 13 in any desired manner whereby the fluid casting material in the case or chamber 5 will be forced into the machine 13 through the broken off right end of the case as shown on the drawing.

In the ring-shaped disc of the head piece 4 there is provided a groove to receive a piston ring 14. A similar piston ring 15 is provided on the pin or bolt 6. Finally there is provided a central oil bore 16 in the piston rod 1 through which oil under pressure may be forced into the internal space of the piston 2 from which the oil may then be directed on the bolt or pin 6 and on the ring-shaped disc of the head member 4 by being forced through a slit in a piston ring on the bolt 6 so that thereby the operating surfaces in the fill case 5 will be coated with oil and particularly for the backward movement of the piston to the left as shown on the drawing. Thus, the head disc 4 as well as the asbestos ring 11 will be without pressure and the oil can thus be forced on the ring shaped disc of the head piece 4.

While the ring packing member 11 is preferably made of asbestos or asbestos fibers it can also be made of any number of elastic plastic materials and synthetic materials capable of withstanding pressure forces, and high temperatures of the fluid casting material preferably light metal or zinc.

I claim:

1. An injection casting machine, particularly cold metal chamber machines comprising a piston member having a frusto-conical surface on one end thereof, an axially displaceable head piece mounted on the end of the piston member and guided piston-like in a bore in the piston, an elastic packing ring mounted adjacent the head piece and in contact with the frusto-conical surface and subject to the pressing force of the piston, and a fill case into which the piston and the head piece is operative with the packing ring in contact with the fill case.

2. An injection casting machine according to claim 1, in which the packing ring is composed of asbestos.

3. An injection casting machine according to claim 1, in which a guide bolt is provided in the head piece slidable in an axial bore in the end of the piston, the said bolt having limited movement with respect to the piston.

4. An injection casting machine according to claim 1, in which a guide bolt is provided in the head piece slidable in an axial bore in the end of the piston, the said bolt having limited movement with respect to the piston, and in which the head piece comprises a circular plate with the guide bolt extending axially therefrom.

5. An injection casting machine according to claim 1, in which a guide bolt is provided in the head piece slidable in an axial bore in the end of the piston, the said bolt having limited movement with respect to the piston, the head piece and the guide bolt each having a piston ring accommodated in an annular groove.

6. An injection casting machine according to claim 1, in which a connecting rod is provided having a central bore through which oil is forced under pressure to the connecting rod into the interior of the injection piston to lubricate the chamber face.

References Cited by the Examiner

UNITED STATES PATENTS

| Re: 14,707 | 8/19 | Arbuckle | 184—19 |
| 1,083,957 | 1/14 | Trist | 184—19 |
| 1,277,410 | 9/18 | Hall | 184—19 |
| 2,219,385 | 10/40 | Ernst | 207—9 |
| 2,783,499 | 3/57 | Billen | 207—9 |

FOREIGN PATENTS 908,322   9/45   France.

MICHAEL V. BRINDISI, *Primary Examiner.*